E. Jacobs.
Iron Structure.
No. 29,282.    Patented Jul. 24, 1860.
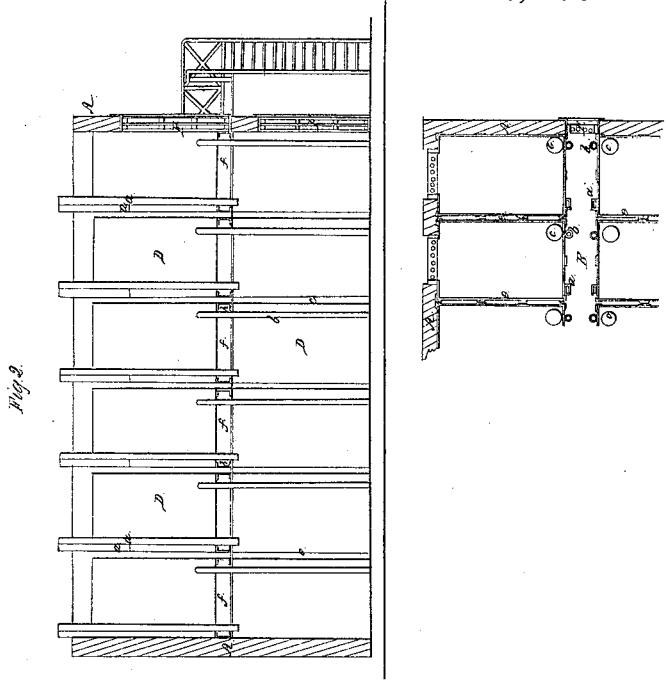
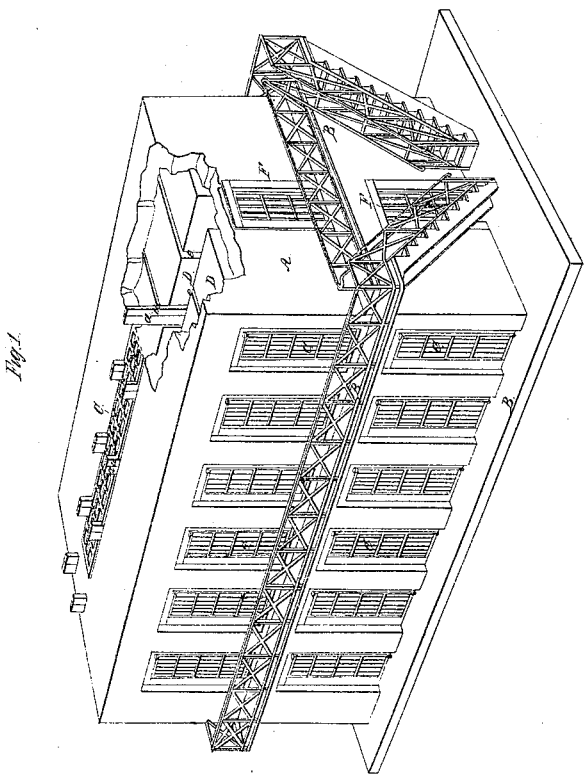
Witnesses:
Wm Clough
Charles S. Fisher
Inventor;
E. Jacobs

UNITED STATES PATENT OFFICE.

E. JACOBS, OF CINCINNATI, OHIO.

IRON PRISON.

Specification of Letters Patent No. 29,282, dated July 24, 1860.

*To all whom it may concern:*

Be it known that I, E. JACOBS, of Cincinnati, in the county of Hamilton and State of Ohio, have invented a new and useful Improvement in Iron Jails; and I do hereby declare that the following is a full and exact description of the same, reference being had to the accompanying drawings, of which—

Figure 1, is a perspective view of a jail, comprising double rows of cells arranged in two stories. Fig. 2, is a vertical section through the central passage which separates the rows of cells. Fig. 3, is a plan of the cells, and passages.

My invention relates to jails in which the cells are made of plates of iron and riveted together, and it consists in making each cell separate and entire and so arranging them together as to afford a space between each cell, and the cell next adjacent thereto in the manner and for the purpose hereinafter set forth.

Like letters refer to corresponding parts in all the drawings.

A is a wall of masonry inclosing the cells. It is contained within the outer wall of the building.

B is a gallery or area surrounding the wall (A) upon three sides, affording access to all the cells through the doors C. These doors are grated as shown and are hung and secured in the usual manner. The cells D are in rows, arranged with an end of each toward the surrounding gallery or area B, while the opposite end of each is toward a central passage E, which extends the whole length of the row of cells, and is wide enough to afford space for the water pipes, ventilator flues and soil ducts; also to afford an area which may be traversed by the guard or person having charge of the prison unobserved and unknown to the prisoners, for the purpose of overhearing and detecting conspiracies among them, or any attempts that they may be making to escape. The cells are constructed, each cell separate and independent of all the rest. They are then arranged along side of each other in rows so as to leave a small vacant space $e$ between each two cells, and when the jail consists of more than one story or tier of cells, the tiers or stories are arranged one above another with a similar horizontal space $f$ between each tier, the upper tier being supported upon the tier next below by angle irons or studs ($h$) placed over the corners of the latter as represented in Fig. 2. These spaces if desired may be filled with concrete or some familiar substance such as tan bark or sawdust possessing the property of opposing the transmission of sound.

$a$ $a$ are ventilators, leading from each cell upwardly and discharging through the roof.

$b$ $b$ are soil ducts.

$c$ $c$ are stools placed in the cells.

F is a grated door leading from the area B surrounding the cells into the secret passage E between the rear ends of the rows of cells. A grated covering G affords a walk or floor upon the level with the floors of each tier of cells. The openings in the walk or floor admit the light from a window in the roof into the passage, they also allow of the escape of foul air.

Iron-plate jail cells have heretofore been made united, with a single partition of iron separating the two adjacent cells, that is, the cells which are alongside of each other as well as those which are arranged one above another. The objection to this manner of constructing and arranging the cells, is, that they afford no adequate security against the intercourse of prisoners in adjacent cells. It is found that conversation can be carried on with considerable facility by the prisoners without being heard by the guard, while the peculiar sonorousness of iron plates is such that by a concerted arrangement of rapping signals they are enabled to communicate with each other with the utmost security against detection. By constructing and arranging the cells separate and distinct from each other with a space between them upon all sides, and having a secret passage for the convenience of the guard when he desires to become acquainted with their movements any attempts on the part of the prisoners to converse or hold clandestine intercourse with each other, or to work their way through the cells by means of tools or levers is easily detected.

The cells could obviously be arranged to open into a central instead of an outside area. In this case the secret passage for the guard or keeper would be made around upon the outside of the space occupied by the cells as provided in my invention for which Letters Patent were granted to me April 7th 1859.

As the secret passage E herein described is only a modification of that which is employed or embraced in the patent above named, I do not claim it as a part of my present invention.

Having described my manner of constructing and arranging iron cells for jails, what I claim as new, and desire to secure by Letters Patent, is—

Constructing and arranging plate iron cells in jails separately from each other, with vertical spaces $e$ between the cells upon the same level, and horizontal spaces $f$ between cells arranged one above another, substantially as and for the purpose described.

E. JACOBS.

Witnesses:
   Wm. Clough,
   Charles L. Fisher.